June 13, 1939.     G. J. KESSENICH     2,161,820
SHOCK ABSORBING DEVICE
Filed May 10, 1938
Fig-1-
Fig-2-
Fig-3-
Fig-4-
Fig-5-
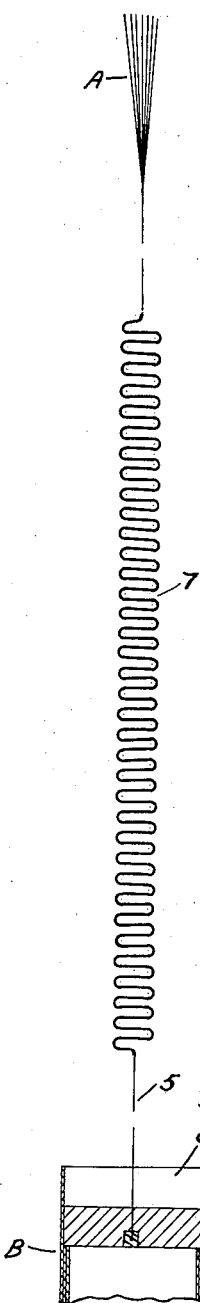
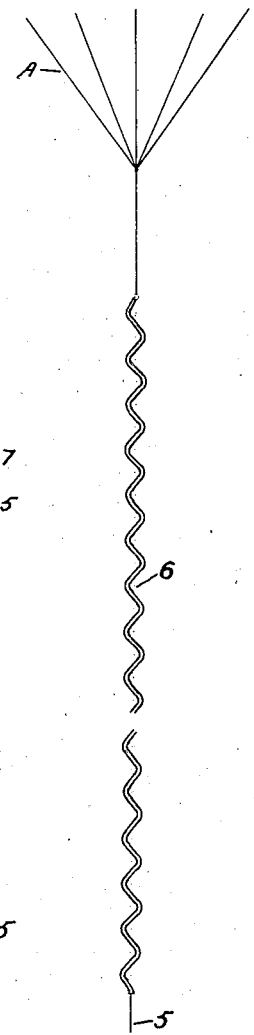
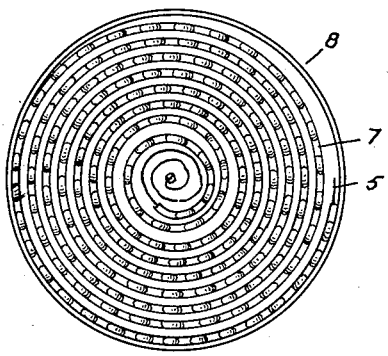
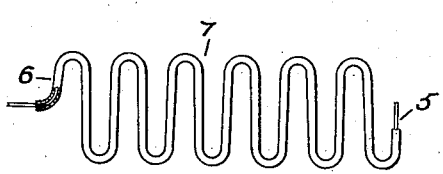
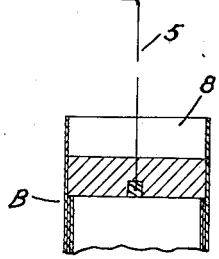
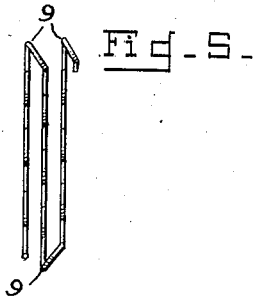
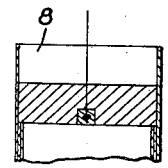
Inventor
Gregory J Kessenich

Patented June 13, 1939

2,161,820

UNITED STATES PATENT OFFICE 2,161,820

SHOCK ABSORBING DEVICE

Gregory J. Kessenich, Madison, Wis.

Application May 10, 1938, Serial No. 207,105

5 Claims. (Cl. 244—138)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a shock absorbing device and more particularly it has reference to that class of shock absorbers which are particularly adapted to parachute suspensions though not limited thereto.

When a parachute and a body to be suspended thereby are traveling at high speed at the time the parachute is opened, the shock occasioned by the sudden retardation is frequently sufficient to cause the shrouds or the fabric of the parachute to give away or to cause injury to the suspended body.

The purpose of this invention is to associate a shock absorbing element with the suspension cable and to so form and arrange the element that it will resist straightening of the cable and thereby provide a gradual retardation of the suspended body when the parachute is opened.

A further object is to so form the shock absorbing element that it may be conveniently packed into a container without loss of space.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation of the shock absorbing device prior to opening of the parachute.

Fig. 2 is a similar view with the parachute open, the suspension cable being under tension and the shock absorbing element partly straightened out;

Fig. 3 is a plan view showing a method of packing the shock absorbing device in a cylindrical container;

Fig. 4 is an enlarged view in side elevation with parts in section of a portion of the shock absorbing device;

Fig. 5 is a plan view showing folded sections of the folded member.

Referring to the drawing by characters of reference there are shown the shrouds A of a parachute and a body B connected to the shrouds by a flexible suspension cable 5. A portion of the cable passes through a tube 6 of bendable material, such as copper. This tube is formed into a plurality of folds 7 which will resist straightening out due to the pull of the cable 5.

The folded tube is normally carried in a container which may be associated with either the body or the shrouds or which may be independent of these members. In order to make efficient use of the available space in the container the tube is rolled into a plane spiral as shown in Fig. 3 and placed in the container.

When the parachute and the body to be suspended thereby are released in space their separation causes the tube to be withdrawn from its container as shown in Fig. 1. The parachute on opening is retarded and the energy of the falling body is gradually absorbed by the straightening out of the tube due to the pull of the cable. This yielding action of the tube reduces the velocity of the unit in falling and reduces the shock to the elements of the unit. Breaking of the tube at any point after bending will not interfere with the accomplishment of its mission.

The adaptability of the folded arrangement of the tube for convenient packing is further illustrated in Fig. 5 in which sections of the tube are folded by reversing the bends as at 9. This provides for packing in a rectangular container.

I claim:

1. A shock absorbing device comprising a flexible cable and a tubular metallic member surrounding a portion of the cable and having a plurality of folds to provide bent portions for yieldingly resisting straightening out of said tubular member when tension is applied to the cable and adapted to remain straightened out, said tubular member being wound in a plane spiral for packing in a container.

2. A shock absorbing device comprising a flexible cable and a tubular metallic member surrounding a portion of the cable and having a plurality of folds to provide bent portions for yieldingly resisting straightening out of said tubular member when tension is applied to the cable and adapted to remain straightened out.

3. A shock absorbing device comprising a flexible cable, a bent and bendable member surrounding a portion of said cable and having a plurality of folds for yieldingly resisting straightening out when tension is applied to the cable and adapted to remain straightened out said member wound in a plane spiral for packing in a container.

4. A shock absorbing device comprising a flexible cable, a bent and bendable member surrounding a portion of said cable and having a plurality of folds for yieldingly resisting straightening out when tension is applied to the cable and adapted to remain straightened out.

5. A shock absorbing device comprising a flexible cable, a bent and bendable member surrounding a portion of said cable and having a plurality of folds for yieldingly resisting straightening out when tension is applied to the cable and adapted to remain straightened out, and sections of said bent member being folded upon themselves.

GREGORY J. KESSENICH.